C. W. HAZELETT.
ELECTRIC BATTERY.
APPLICATION FILED SEPT. 23, 1916.
1,260,379.
Patented Mar. 26, 1918.
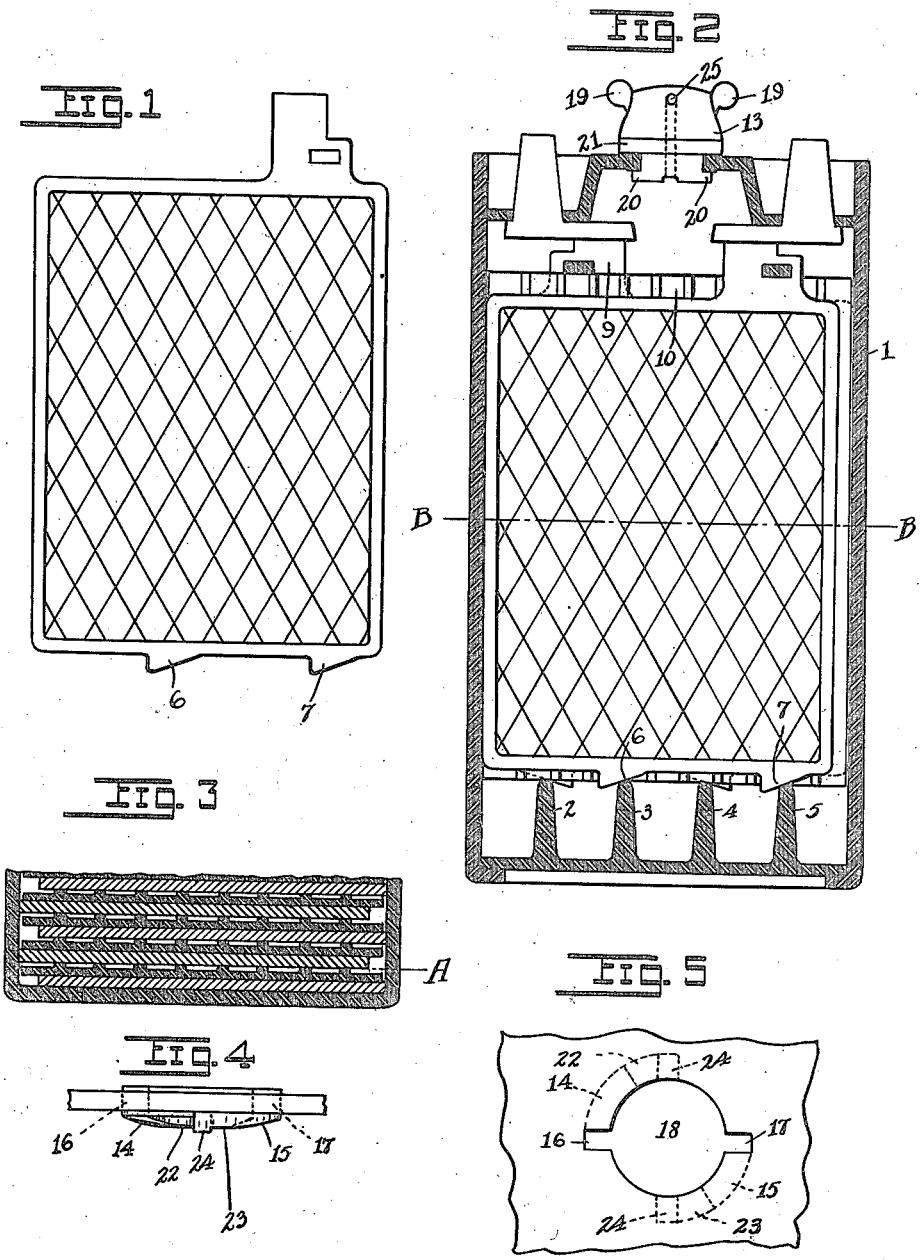
INVENTOR.
C. W. HAZELETT
BY
Ira J Adams,
ATTORNEY

UNITED STATES PATENT OFFICE.

CLARENCE W. HAZELETT, OF LAKEWOOD, OHIO, ASSIGNOR, BY MESNE ASSIGNMENTS, TO NATIONAL CARBON COMPANY, INC., A CORPORATION OF NEW YORK.

ELECTRIC BATTERY.

1,260,379.  Specification of Letters Patent.  Patented Mar. 26, 1918.

Application filed September 23, 1916. Serial No. 121,720.

*To all whom it may concern:*

Be it known that I, CLARENCE W. HAZELETT, a citizen of the United States, residing at Lakewood, in the county of Cuyahoga and State of Ohio, have invented a certain new and useful Improvement in Electric Batteries, of which the following is a full, clear, and exact description.

This invention relates to electric batteries particularly of the secondary type in which the electrodes are separated by wood or other insulating material.

It is the usual practice to place the lead plates, both positive and negative, on ridges or spacers on the bottom of the battery jar or container, two adjacent plates of opposite polarity being separated by a wood or other separator which also is intended to rest on the ridges. When this practice is followed, spongy lead or lead oxid is liable to accumulate under the wood separator on the bottom ridges and form a short circuit path for the current between adjacent positive and negative plates.

Since the separators are somewhat smaller in width than the container, to permit easy insertion, it sometimes happened in prior types that two adjacent plates of opposite polarity would slide over in contact with one side of the jar, while the separator therebetween might be in contact with the opposite side of the jar. This would leave open space at the first mentioned side where lead oxid or spongy lead could accumulate and form a short circuit.

My invention aims to overcome both of the above disadvantages.

Referring to the drawings:—

Figure 1 is an elevation of my improved form of plate.

Fig. 2 is a partial sectional elevation of a storage cell taken on the line A—A of Fig. 3.

Fig. 3 is a partial horizontal section of the cell taken on line B—B of Fig. 2.

Fig. 4 is an elevation of a portion of the cover adjacent the filling opening.

Fig. 5 is a top view of the portion shown in Fig. 4.

Referring to Fig. 1, the battery jar 1 of rubber or other suitable material, has a plurality of ridges 2, 3, 4 and 5 on the bottom to support the plates and separators, as is usual in storage batteries. However, instead of permitting the frames of both positive and negative plates to rest on all of the ridges, I construct it so that the negative plates will contact with certain of the ridges, while the positives will contact only with the remaining ridges. I also construct it so that the positive plates will be automatically forced against one side of the jar, while the negatives will be forced against the other side. I accomplish both of these results by forming feet 6, 7 on the frame of the plates, both positive and negative, in such position as to rest on either the ridges 3, 5 or the ridges 2, 4, depending upon which way the plate is placed.

In pasting or incorporating the active material in the grids, the same type of grid may be used for both the negative and positive electrodes. However, in placing the pasted electrodes in the jar, one of the electrodes will be reversed, that is, the positive electrode 8, say, will be placed with the slanting feet 6, 7 in engagement with ridges 3, 5, while the negative plate 9 will be reversed and placed with the feet in engagement with ridges 2 and 4, the two electrodes being separated by the usual separator 10 which may be made of wood corrugated or grooved on one side. The remaining electrodes of the cell will be assembled in the same way. It will be apparent that the positive electrode will automatically move over and wedge against the left hand side of the cell container, as shown in Fig. 2, due to the slanting feet 6, 7 resting on the ridges 3 and 5. Likewise the negative grids 9 will automatically wedge against the right hand side of the jar as the feet on such electrodes have a reverse slant, the plates having been reversed.

Referring particularly to Fig. 3, it will be seen that danger of short circuits between the adjacent positive and negative electrodes at the side of the jar is practically eliminated, as the two electrodes cannot be placed directly against the same side of the jar.

Short circuits at the bottom of the electrodes are also eliminated, as the electrodes of one polarity are out of contact with the ridges that support the electrodes of the other polarity, and an accumulation of oxid or spongy lead on any one of the ridges is not liable to join any two adjacent electrodes.

In portable batteries the motion of the vehicle causes the plates to vibrate and wear away the wood separators. An important advantage of my improvement is that such vibration is prevented by the wedging of the plates against the sides of the jar.

Another feature of my invention is the filling and vent plug 13 (Fig. 2). This plug makes a cam locking bayonet joint with the cover which has arcuate cam surfaces 14, 15 extending from slots 16 and 17. The wings 19 on the plug are in line with the locking arms 20 so as to aid in placing the plug into hole 18.

To place the plug into position, the arms 20 may be readily placed through the slots 16 and 17 in the cover without turning the plug over to see the position of the arms, as they are in line with the wings 19 on the top of the plug. A turn to the right of about 90° locks the plug against an elastic washer 21 on top of the cover. This is accomplished by the arms riding up on the cam surfaces 14 and 15 onto the flat portion 22, 23. An abutment 24 prevents further movement. A reverse operation will take place in removing the plug. A hole 25 in the plug permits escape of gas.

Having described my invention, what I claim is:

1. In storage batteries, a container having a plurality of spacing ridges on the bottom, a positive electrode having feet resting on certain of said ridges, a negative electrode having feet resting on the other of said ridges, said ridges and feet having means adapted to force the positive electrode in one direction against the side of the jar, and the negative electrode in an opposite direction against the other side of the jar.

2. In storage batteries, a container having a plurality of spacing ridges on the bottom, a positive electrode having feet with alining surfaces abutting against certain of said ridges and adapted to wedge it against one side of said container, and a negative electrode having feet with alining surfaces co-acting with others of said ridges to wedge it against the other side of said container.

3. In storage batteries, a jar having a plurality of spacing ridges on the bottom, a positive electrode having feet with oblique bottom surfaces adapted to co-act with certain of said ridges to force it against one side of the jar, a negative electrode having feet with oblique bottom surfaces adapted to co-act with the remainder of said ridges to force it against the other side of said jar and a separator resting on said ridges and located between said electrodes.

In testimony whereof, I hereunto affix my signature.

C. W. HAZELETT.